May 27, 1958     E. F. DYSON     2,836,153

PILOT VALVE

Filed Aug. 24, 1954

United States Patent Office 2,836,153
Patented May 27, 1958

2,836,153

PILOT VALVE

Ernest F. Dyson, Meriden, Conn., assignor to The Bristol Company, Waterbury, Conn., a corporation of Connecticut Application August 24, 1954, Serial No. 451,808

7 Claims. (Cl. 121—46.5)

This invention relates to pilot valves for fluid-actuated control apparatus, and more especially to a removable pilot valve for pneumatic control devices.

A common form of pilot valve for pneumatic control involves a seating member subject to actuation by variations in fluid pressure on a diaphragm or in a capsular spring, the seating member cooperating with a seat to provide a variable closure in a conduit conducting compressed air to a pneumatic motor-operated control apparatus. Said fluid pressure is regulated by means of a supply-and-waste member wherein the admission of air is limited by means of a fixed restriction in the supply and the escape is controlled by means of a vane, baffle, "flapper" or obturator, more or less juxtaposed to a small escape orifice communicating with the atmosphere. The principle of these pilot valves is well known, and they are available in a considerable variety of forms. In general, however, they are delicate in construction, requiring relatively expensive parts, and demanding high mechanical skill in their assembly and adjustment.

It is an object of the present invention to provide a pilot valve having desirable operating characteristics and adapted to manufacture on a production basis by automatic machinery.

It is a further object to provide a pilot valve of the above type incorporating in its structure no springs or parts requiring close dimensional tolerances.

It is a further object to provide a valve of the above type which may quickly be removed and replaced without the need for special tools or great skill in manipulation.

It is a further object to provide a pilot valve having incorporated in its structure the constriction essential to the supply-and-waste method of control, said constriction being of a nature not subject to clogging or stoppage by foreign particles entrained in the air-stream.

It is a further object to provide a removable pilot valve assembly adapted to insertion in, and removable from, a common air-block or manifold without the need for interrupting the air supply to associated pilot valves.

In carrying out the purposes of the invention, there is provided a pilot valve assembly whose metal parts are stamped or spun from sheet material, cut from standard tubing, and formed on automatic machinery with no requirement for close tolerances, and whose non-metallic components may readily be moulded or otherwise produced on a quantity basis.

Further objects as well as advantages of the present invention will be apparent from the following description and the accompanying drawings in which.

Figure 1:
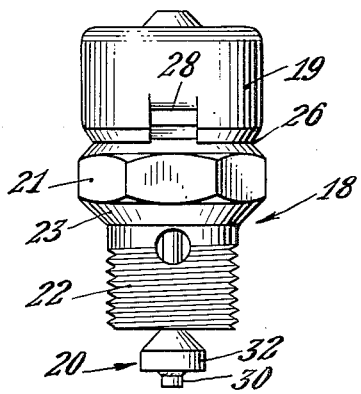
Figure 1 is a side elevational view of a pilot valve incorporating the principles of the invention.

While the apparatus of the present invention and the immediately associated instrumentalities are adapted to operation by any suitable expansible fluid, the most common medium for this purpose is compressed air at a supply pressure of the order of 20 to 40 pounds per square inch; and in the interest of simplicity and clarity the description will be given as applicable to such a system, without in any way excluding the use of other fluid agents should their utilization be found expedient.

Referring now to the drawings, the numeral 10 designates a portion of a controller component commonly known as an "air-block," formed usually of metal, and having formed therein one or more substantially cylindrical openings, each providing a receptacle for one of the pilot valves to which the present invention is directed. Each of the openings in the air-block 10 comprises an inner cavity 12 and an outer counterbored portion 13 spaced from said cavity by a section 15 having formed therein a female thread. The inner cavity 12 communicates with air supply source 16, and the outer portion 13 with a conduit 17 providing communication to a diaphragm motor or corresponding actuating element of a control device 14 (Figure 2) to be operated through the functioning of the pilot valve. The outer edge of the counterbored portion 13 where the opening intersects the surface of the air-block 10 is machined to a smooth surface, either forming a right angle, or slightly chamfered for sealing engagement with a further element now to be described.

The valve 11 comprises a body which includes a body portion 18 and a cap or cylinder 19, and in which there is located a movable seating member 20. The body portion 18 may expediently be machined from hexagonal metal bar stock, leaving an upper, or outer part 21 having the original section, and having a threaded lower, or inner part 22 adapted to cooperate with the threaded section 15 in the air-block 10 in securing said body portion within said air-block.

Between the portions 21 and 22 of the member 18 is formed a conically tapered transition section 23, adapted as the portion 22 is screwed into the block 10 to engage the edge of the counterbore 13 in sealing relationship, thereby preventing communication between said counterbore and the surrounding atmosphere.

The member 18 is axially bored through to a diameter of the order of one third that of the threaded part 22, and both extremities of the bore where it intersects the flat terminal surfaces are suitably finished for sealing relationship with the seating surface of movable member 20 presently to be described.

The upper extremity of the threaded part 22 is transversely drilled through, whereby to provide free communication between the interior bore of the member 18 and the counterbore 13 when said member is screwed into its place in the air-block 10. The upper extremity of the member 18 is formed with an annular central ridge portion 24 surrounded by a rabbet 25; and between the base of said rabbet and the normal hexagonal section of the part 21 is formed an angular groove 26 surrounding the body portion 18.

The cap or cylinder member 19 is spun, stamped or otherwise formed from sheet metal, and comprises a short cylindrical section of internal diameter slightly less than the minimum diameter of the hexagonal portion 21, substantially closed at its upper extremity by a domed portion having a centrally located orifice or nozzle 27 of capillary dimension and adapted to the passage of air therethrough. The lower portion of the member 19 is extended in the form of a skirting having formed therein a number of axially extending slits whereby to permit the bending inward of a plurality of intermediate tongue portions 28 as hereinafter to be explained.

The movable seating member 20 is comprised of three parts, an extended tubular stem portion 30, a piston element 31 carried on one extremity of said stem portion, and a plug element 32 carried near the other extremity thereof, said three parts being assembled as described and integrated into a unitary assembly. The stem portion 30 is comprised of a straight section of metal tubing having a capillary bore adapted to permit a restricted flow of pressure fluid therethrough. The piston element 31 is formed of slightly resilient material, such as rubber of a firm texture, having an external diameter to provide a running fit within the cylindrical portion of the member 19 and an extended length to permit limited displacement therein in an axial sense thereby forming a variable-volume chamber. Said piston element is sealed, moulded, or otherwise permanently attached to one extremity of the tubular stem portion 30. The plug element 32 is formed preferably of metal, and is provided with a conical seating surface adapted to engage the lower end of the bore through the member 18 in sealing relationship, and is bored through to the diameter of the outside of the tubular stem 30.

Assembly of the pilot valve is effected in the following manner. The piston element 31, permanently attached to the stem 30, is placed within the cylindrical portion of the cap member 19, and the tongues 28 are bent inwardly beneath the piston permanently retaining it within the cylindrical portion, with freedom for limited longitudinal displacement therein, and providing a positive stop against which said piston may rest when at the external, or lower limit of its travel. The skirted portion of the member 19 is then slipped over the upper extremity of the body 18, with the stem 30 extending through the bore of said body and projecting beyond the base thereof. The skirting is then spun into the groove 26, providing a permanent attachment of the member 19 to the body 18, but leaving vents in the spaces formerly occupied by the tongues 28, whereby the annular rabbet 25 is in permanent communication with the atmosphere.

Figure 2:
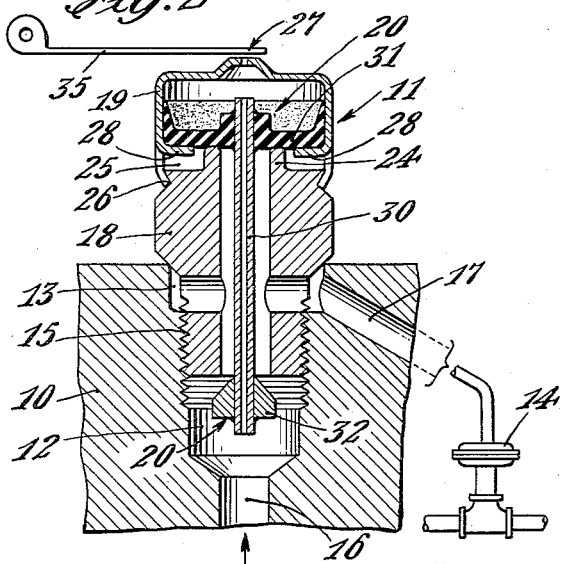
Figures 2 and 3 are side elevational views, in section, showing the valve of Figure 1 in its two extreme operating positions, as well as its manner of installation in the air-block of a pneumatic control instrument.

The plug member 32 is then placed over the lower extremity of the tubular stem 30 and sealed thereto, as by soldering. The longitudinal position of the plug member 32 with respect to the movable element 20 is so selected that when the latter is moved toward its topmost position (Figure 3) said plug member will engage the bottom of the body 18 in sealing relationship before the piston 31 can reach the top of the cap member 19 to be stopped thereby and when said movable element is in its lowest position, as determined by engagement of the piston member 31 with the annular ridge portion 24, the plug member 32 will clear the base of said body member sufficiently to permit free communication between the interior bore of said body member and outside space (Figure 2). The length of the stem portion 30 is made such that when assembled as described, the extremity of the stem is not flush with the base of the plug that projects beyond the same by an appreciable distance at least as great as the external diameter of said stem.

It will be seen that as the valve assembly is screwed into the air-block 10 the cooperating threaded portions will serve not only to secure said valve in place and to force the tapered section 23 into sealing relationship with the outer edge of the counterbore 25, but the threaded portions in themselves will provide a seal between the cavity 12 and the counterbore 13.

Operatively associated with the valve is a vane or baffle member 35 movably juxtaposed to the orifice 27, whereby more or less to obstruct the escape of air therefrom, thus to command the operation of the pilot valve as now to be fully explained.

The sectional view in Figure 2 shows the pilot valve with the movable member 20 in the position it may assume under the influence of gravity alone, when installed in a vertical position with the orifice 27 at its uppermost extremity. With the movable member 20 in its lowest position, the piston 31 will rest upon the upper seating surface of the annular ridge 24, while the plug member 32 will occupy a position below that of engagement with the lower surface of said body member, thus leaving around said plug member an annular space whereby the cavity 12 will be in free communication with the interior of said body member, and, through the transverse openings therein, also with the counterbore 13 and with such pressure responsive apparatus as may be connected to the outlet conduit 17.

Upon application of air pressure from the supply source 16 to the cavity 12, there will thus be a free flow of air from said source through said conduit, and operating pressure will be applied to said apparatus, to actuate the same. At the same time, a restricted flow of air will take place from the cavity 12 through the capillary bore of the tubular stem 30 to the space above the piston 31. With the baffle 35 in the position shown, substantially closing the orifice 27, a pressure will build up in said space, tending to maintain the piston in its lowest position, sealing communication between the interior bore of the body 18 and the atmosphere, and causing pressure to be maintained upon the controlled apparatus.

Upon displacement of the baffle 35 away from its position of juxtaposition to the orifice 27, air will escape at an accelerated rate from the space above the piston 31; and as admission of air to said space is limited by the small bore of the tubular stem 30, the pressure therein will fall to a value only slightly above atmospheric. Under this condition, the pressure within the interior bore of the body 18, acting upon the lower face of the piston 31 will lift the same sufficiently to unseat it from the top of said body, permitting a flow of air from said bore to the atmosphere. The momentarily accelerated flow of air both under the piston 31 and around the plug member 32 will intensify the action of the moving part 20, so that it will move abruptly to the upper extremity of its travel, causing the plug member 32 to seat upon the lower face of the body 18, sealing the bore of said body from the supply pressure in the cavity 12, and the pressure within the body and in all communicatinng spaces, including the counterbore 13, the conduit 17, and any controlled device connected thereto, to fall to substantially atmospheric value. Under such conditions the movable portions assume the position shown in Figure 3. Upon the baffle 35 being resetored to a position substantially to obstruct the orifice 27, the pressure above the piston 31 will build up, forcing the moving member 20 downward against the upward force on the plug 32, and causing the elements of the valve again to assume the operating position indicated in Figure 2.

Figure 3:
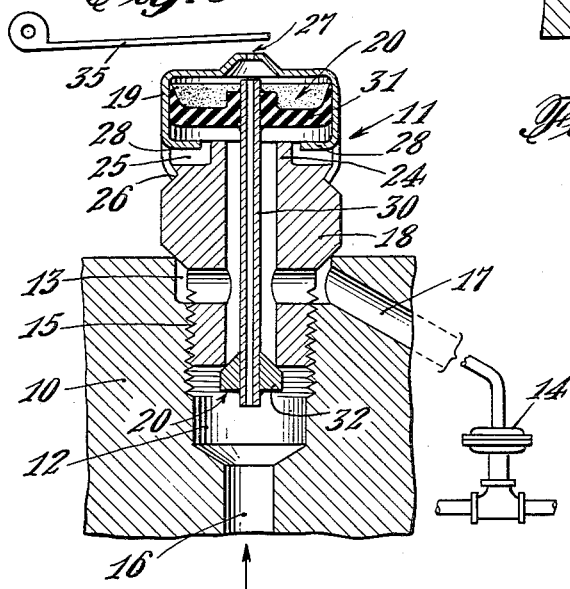
Figure 4:
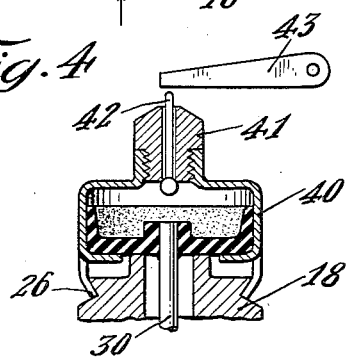
Figure 4 is a sectional side elevational view of a portion of an alternative form of valve embodying the principles of the invention.

In the form of the invention shown in Figure 4 the baffle 35 cooperating with the orifice 27 of Figure 2, to modify the escape of air from the space above the piston 31 is replaced by a positively sealing poppet valve arrangement. This is embodied in a structure wherein the cap 19 of Figures 1, 2 and 3 is replaced by a cap 40 having its lower parts identical with those of the cap 19, for providing attachment to the body portion 18, but, instead of a small orifice in its upper extremity, having an enlarged and threaded opening into which is tightly screwed a nozzle member 41 having an axial hole drilled therethrough. Positioned within the hole in the nozzle member 41 is a valve element 42 comprising a small straight rod or wire or stem portion extending out through the tip of the nozzle, and having attached to, or formed upon, its inner extremity a seating portion, which may take the form of a metal ball of diameter greater than that of the drilled hole, and adapted to seat upon the lower end thereof. Suitably mounted for limited displacement adjacent the nozzle member 41 is a finger or tappet member 43 adapted to engage the tip of the stem portion of the valve element 42, thereby forcing the seating portion away from engagement with the inner extremity of the hole through said nozzle portion, and permitting substantially free communication between the enclosed chamber and the external atmosphere. The finger or tappet member 43 being designed to present subtantially no obstruction to escape of air from the orifice member, it will be seen that in so far as involves the influence of displacement of the tappet member on air pressure within the valve chamber, the effect will be the opposite of that characterizing the coaction of the baffle 35 with the orifice 27 in the previous embodiment of the invention. Under "normal" conditions, with the tappet member 43 out of engagement with the valve element 42, pressure within the main valve body, acting upon the seating portion of the valve member 42, will force the latter into engagement with the nozzle member, preventing escape of air, and causing pressure to build up above the piston 31. Forcible engagement of the tappet 43 with the valve element 42 will overcome the fluid pressure seating the latter within the nozzle member 41, allowing air to escape and pressure above the piston to be relieved. Otherwise, the operation and coaction of all parts of the device are identical with those set forth for the form shown in Figures 1, 2 and 3.

Figure 5:
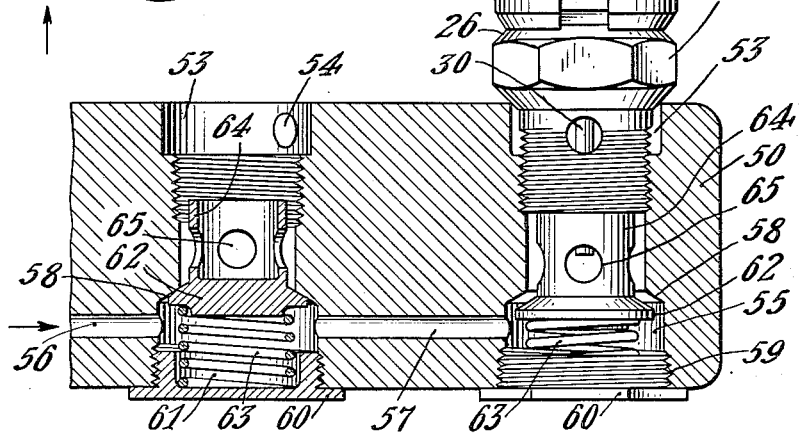
Figure 5 is a sectional view showing a pilot valve inserted in a manifold air-block including means whereby the pilot valve may be inserted and removed without the need for interrupting the air supply.

Figure 5 illustrates a section of a manifold air-block 50 showing two cavities, one having, and one lacking, a pilot valve operatively inserted therein. The pilot valve may be of either of the forms hereinbefore described. Each cavity formed in the block penetrates from its upper to its lower surface, the upper part of each having a counterbored portion 53 exactly corresponding to the counterbored portion 13 shown in Figure 2, and having an outlet port 54 communicating through conduit means not shown but corresponding to the conduit 17 of Figure 2, with controlled apparatus to be made subject to operation by the pilot valve. The lower portions of the cavities are bored out to form chambers 55, these being placed in communication with each other as by internal conduit 57 and with an air supply source 56. The inner part of each of said chambers is formed to a conical seating surface 58, and the outer end is provided with an internal thread 59 whereby to receive a threaded cap member 60 to seal the lower end of the cavity when screwed into the same. Each cap is preferably provided with an internal recess 61.

In the middle portion of each of the cavities is positioned an axially displaceable plug member 62 having a seating surface conformed to engage the corresponding seating surface 58 in the cavity to form a fluid-tight seal therewith. A compression spring 63 extending from the base of the plug member 62 into the recess 61 in the cap member 60 serves to force the former toward a position of sealing engagement with the interior of the cavity. Each of the plug members 62 is provided with an axially extended hollow cylindrical portion 64 projecting toward the counterbored portion 53 and of such length that when the pilot valve is screwed into place its lower face will engage the end of said cylindrical projection, whereby to force the plug axially to a position where it cannot seat upon surface 58 of the cavity. The annular wall of the cylindrical portion 64 is provided with one or lateral openings 65, whereby to obtain free communication between the interior and exterior thereof.

Thus, when the pilot valve is screwed into place in the cavity in the manifold block, its lower face will engage the top edge of the cylindrical portion 64 and will force the plug member toward its lowest position unseating the latter from its engagement with the conical seat 58. There will thus be free communication between the chamber 55 and the annular space around the cylindrical portion 64, and, through the openings 65, with the space below the pilot valve, whereby to provide a supply of air for the pilot valve so long as the latter is in place. As the pilot valve is loosened from the air-block, the spring 63, acting upon the plug member 62, will force the latter into sealing engagement with surface 58 of the cavity in the air-block; and as the pilot valve is removed, the air supply will be sealed off from communication with the corresponding cavity in the block. In this way, any one of the pilot valves may be removed for examination or replacement, without the need for shutting off the air supply or in any way interfering with the operation of other pilot valves in the system.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having two seating surfaces spaced a predetermined distance with one of said seating surfaces being associated with said inlet and the other seating surface being on the side of said outlet away from said one seating surface, a tubular member longer than said distance and axially extending in said body, a piston element connected to said tubular member adjacent to one end thereof and engaging interior surfaces of said body, one side of said piston element forming with said body a variable volume chamber, said body having an orifice formed therethrough communicating with said chamber and at least one opening communicating through said other seating surface with said outlet, the other end of said tubular member extending through said inlet, a plug element connected to said tubular member adjacent to the other end thereof and adapted to seat on said one seating surface for sealing said inlet, said other side of said piston element being adapted to seat on the other seating surface for interrupting communication between said opening and outlet, said piston element, tubular member and plug element being free for limited axial displacement in said body between two extreme positions of alternatively engaging said piston element and plug element with their respective seating surfaces, and the internal bore of said tubular member being an axial capillary bore formed therethrough one end of which communicates with said chamber and providing restricted communication thereto.

2. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having two spaced seating surfaces with one of said seating surfaces being formed in said inlet and the other seating surface being on the side of said outlet away from said one seating surface, an elongated tubular member axially extending in said body intermediate said seating surfaces and having a portion thereof extending externally through said inlet, a piston element connected to said tubular member and engaging interior surfaces of said body and forming therewith a variable-volume chamber, said body having an orifice formed therethrough communicating with said chamber and at least one opening communicating through said other seating surface with said outlet, a plug element connected to said externally extending portion of said tubular member and adapted to seat on said one seating surface for sealing said inlet, said piston element being adapted to seat on the other seating surface for interrupting communication between said opening and outlet, said piston element, tubular member and plug element being free for limited displacement in said body between two positions for alternatively engaging said piston element and plug element with their respective seating surfaces, and the internal bore of said tubular member being an axial capillary bore formed therethrough one end of which communicates with said chamber and for affording restricted communication between said chamber and the external side of said plug element.

3. A pilot valve for controlling the flow of a fluid from a pressure source to a control element in response to variations in the flow of a relatively small volume of fluid initiated by independent control means, comprising a body having an internal seating surface formed therein, said body having an inlet formed therein spaced from said internal seating surface and adapted to be coupled to said source, said body also having an outlet formed therein intermediate said internal seating surface and said inlet and adapted to be coupled to said control element, said body forming a second seating surface at said inlet and spaced a predetermined distance from said internal seating surface, a tubular member having a length greater than said distance and extending in said body through said internal seating surface and through said inlet, a piston element connected to said tubular member on the side of said internal seating surface away from said second seating surface, said piston element engaging interior surfaces of said body and forming therewith a variable-volume chamber, said body having an orifice formed therethrough communicating with said chamber and at least one opening communicating with the atmosphere and with said outlet through said internal seating surface, a plug element connected to said tubular member and positioned externally of said inlet spaced from said piston element with the distance therebetween greater than said predetermined distance and adapted to seat on said second seating surface for sealing said inlet, said piston element being adapted to seat on said internal seating surface for interrupting communication between said opening and outlet, said piston element, tubular member and plug element being free for limited axial displacement in said body between two extreme positions for alternatively engaging said piston element and plug element with their respective seating surfaces, and the internal bore of said tubular member being an axial capillary bore formed therethrough one end of which communicates with said chamber and for affording restricted communication between said chamber and the external side of said plug element.

4. A pilot valve for controlling the flow of a fluid from a pressure source to a control element in response to variations in the flow of a relatively small volume of fluid initiated by independent control means, comprising an elongated body portion having a longitudinal bore formed therethrough and having coaxial seating surfaces formed adjacent either end of said bore, one end of said body portion being adapted to be coupled to said source with one end of said bore forming an inlet therefor, said body portion having an outlet formed therein adapted to be coupled to said control element and communicating with said bore intermediate said seating surfaces, a tubular member extending axially through said bore and projecting from either end thereof, movable means connected to said tubular member adjacent the end thereof projecting from the other end of said body portion, a cup-shaped member connected to said body portion and enclosing said movable means with the movable means engaging the interior surface thereof and forming a variable-volume chamber therewith, said cup-shaped member having an orifice formed therethrough on one side of said movable means communicating with said chamber and having at least one opening therethrough communicating with the atmosphere on the other side of said movable means and through said bore with said outlet, a plug element connected to said tubular member adjacent to the other end thereof externally of said bore and adapted to seat on the seating surface adjacent to said one end of said body portion for closing said inlet, said other side of said movable means being adapted to seat on said seating surface adjacent to the other end of said body portion for interrupting communication between said opening and outlet, said piston element, tubular member and plug element being free for limited axial displacement between two extreme positions for alternatively engaging said piston element and plug element with their respective seating surfaces, and the internal bore of said tubular member being an axial capillary bore formed therein one end of which communicates with said chamber and for affording restricted communication between said chamber and the external side of said plug element.

5. A pilot valve for controlling the flow of a fluid from a pressure source to a control element in response to variations in the flow of a relatively small volume of fluid initiated by independent control means, comprising a substantially cylindrical body portion having an open-ended axial bore formed therethrough of a predetermined length, a cup-shaped member having inwardly turned rim portions engaging and securing the same to one end of said body portion and co-axial therewith, said body portion having a transverse bore formed therein communicating with said axial bore intermediate the ends thereof and adapted to be coupled with said control element, a tubular member axially extending through said axial bore spaced from the walls thereof and projecting from either end thereof, a piston element connected to one projecting portion of said tubular member and engaging said cup-shaped member and forming a variable-volume chamber therewith, said piston element being adapted to close one end of said axial bore, a plug element connected to the other projecting portion of said tubular member and adapted to close the other end of said axial bore, said cup-shaped member having an orifice formed therethrough communicating with said variable-volume chamber on one side of said piston element, said cup-shaped member having at least one opening formed therethrough on the other side of said piston element and communicating with said transverse bore through said one end of said axial bore when the latter is open, said piston element and said plug element being spaced a distance greater than the length of said axial bore, said piston element, tubular member and plug element being free for limited axial displacement between two extreme positions for alternatively engaging said piston element and plug element with the respective ends of said body portion and alternatively closing the associated ends of said axial bore, and the internal bore of said tubular member being an axial capillary bore formed therethrough one end of which communicates with said chamber and for affording restricted communication between said chamber and the external side of said plug element.

6. A pilot valve comprising an extended body portion having therethrough a longitudinal opening with an encircling seating surface at each of its extremities and a laterally disposed aperture intermediate said extremities, a threaded portion adjacent one of said extremities for securing said pilot valve in operative position, a displaceable member of greater length than said body part extending through said opening free for limited longitudinal displacement therein and having attached at its respective extremities seating elements adapted alternatively to engage said seating surfaces in sealing relationship according to the longitudinally displaced position of said member, a hollow terminal member at the extremity of said body part remote from said threaded portion thereof providing a cylindrical enclosure coaxial with said opening and having an orifice adapted to be more or less obstructed to modify the escape of pressure fluid from the interior of said enclosure to the atmosphere, one of said seating elements carried by said displaceable member fitting said cylindrical enclosure to form therewith a movable wall of a variable-volume chamber, and means comprised in said displaceable member and providing restricted communication between said variable-volume chamber and a source of pressure-fluid when said body portion is threaded into operative position.

7. A pilot valve comprising an extended body portion having therethrough a longitudinal opening with an encircling seating surface at each of its extremities and a laterally disposed aperture intermediate said extremities, a threaded portion adjacent one of said extremities and on one side of said laterally disposed aperture, a displaceable member of greater length than said body part extending through said opening free for limited longitudinal displacement therein and having attached at its respective extremities a piston element and a seating element adapted alternatively to engage said seating surfaces in sealing relationship according to the longitudinally displaced position of said member, a hollow terminal member at the extremity of said body part remote from the threaded portion thereof, providing a cylindrical enclosure coaxial with said opening and having an orifice adapted to be more or less obstructed to modify the escape of pressure fluid from the interior of said enclosure to the atmosphere, valve means within said variable-volume chamber and normally seating upon the interior wall thereof adjacent said orifice to prevent the escape of pressure-fluid from said chamber, and having a stem member loosely fitting said orifice and projecting exteriorly of said terminal member whereby to be actuated in response to externally applied mechanical thrust, said piston element carried by said displaceable member fitting said cylindrical enclosure to form therewith a movable wall of a variable-volume chamber, and means comprised in said displaceable member and providing restricted communication between said variable-volume chamber and a source of pressure-fluid when said body portion is threaded into operative position.

References Cited in the file of this patent

UNITED STATES PATENTS

| 560,230 | Powers | May 19, 1896 |
| 1,374,860 | Miller | Apr. 12, 1921 |

FOREIGN PATENTS

| 233,110 | Germany | Mar. 29, 1911 |